US011286848B2

(12) United States Patent
Frampton et al.

(10) Patent No.: US 11,286,848 B2
(45) Date of Patent: Mar. 29, 2022

(54) DUAL AXIS ALTERNATOR

(71) Applicant: Kohler Co., Kohler, WI (US)

(72) Inventors: Isaac S. Frampton, Strattanville, PA (US); Adam Larson, Mequon, WI (US); Frank C. Formas, Kohler, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 16/353,679

(22) Filed: Mar. 14, 2019

(65) Prior Publication Data

US 2019/0211746 A1 Jul. 11, 2019

Related U.S. Application Data

(63) Continuation of application No. 14/732,829, filed on Jun. 8, 2015, now Pat. No. 10,273,876.

(51) Int. Cl.
| | |
|---|---|
| *H02K 19/38* | (2006.01) |
| *F02B 63/04* | (2006.01) |
| *H02K 9/19* | (2006.01) |
| *H02P 9/30* | (2006.01) |
| *H02K 7/18* | (2006.01) |

(Continued)

(52) U.S. Cl.
CPC ......... *F02B 63/042* (2013.01); *H02K 7/1815* (2013.01); *H02K 9/19* (2013.01); *H02K 19/28* (2013.01); *H02K 19/38* (2013.01); *H02P 9/302* (2013.01); *H02K 1/182* (2013.01); *H02K 9/00* (2013.01); *H02K 9/22* (2013.01); *H02K 2201/03* (2013.01)

(58) Field of Classification Search
CPC .............................. H02K 19/38; H02K 1/182
See application file for complete search history.

(56) References Cited

U.S. PATENT DOCUMENTS

| 2,093,077 A | 9/1937 | Fraser |
| 3,401,328 A | 9/1968 | Hartung |

(Continued)

FOREIGN PATENT DOCUMENTS

| CN | 1499693 A | 5/2004 |
| CN | 101951062 A | 1/2011 |

(Continued)

OTHER PUBLICATIONS

Chinese Office Action for Chinese Application No. 201610397750.6, dated May 3, 2018.

(Continued)

*Primary Examiner* — Ramon M Barrera
(74) *Attorney, Agent, or Firm* — Lempia Summerfield Katz LLC

(57) ABSTRACT

An alternator includes an exciter field device generating an exciter magnetic field in a first air gap, an exciter armature device configured to rotate with respect to the exciter magnetic field and impart a first voltage in a first set of coils at the first air gap, a main stator device including a second set of coils, and a rotor field device configured to be energized by the first current in the first set of coils and generate a main magnetic field that imparts a second voltage on the main stator device at a second air gap. The main stator device and the exciter field device lie in on a common plane normal to an axis of rotation, and the exciter armature device is inwardly spaced from the exciter field device, main stator device, and the rotor field device.

20 Claims, 20 Drawing Sheets

(51) Int. Cl.
*H02K 19/28* (2006.01)
*H02K 1/18* (2006.01)
*H02K 9/22* (2006.01)
*H02K 9/00* (2006.01)

(56) References Cited

U.S. PATENT DOCUMENTS

| | | |
|---|---|---|
| 3,676,764 A | 7/1972 | Syverson |
| 4,156,172 A | 5/1979 | Hucker et al. |
| 4,292,532 A | 9/1981 | Leroux |
| 4,695,939 A | 9/1987 | Canay |
| 4,743,777 A | 5/1988 | Shilling et al. |
| 4,982,123 A | 1/1991 | Raad |
| 5,023,540 A | 6/1991 | Walton et al. |
| 5,626,105 A | 5/1997 | Locke et al. |
| 6,879,053 B1 | 4/2005 | Welches et al. |
| 7,230,363 B2 | 6/2007 | Stout et al. |
| 7,230,636 B2 | 6/2007 | Iwasa et al. |
| 7,521,835 B2 | 4/2009 | Qu et al. |
| 7,728,447 B2 | 6/2010 | Becquerelle et al. |
| 7,821,145 B2 | 10/2010 | Huang et al. |
| 7,990,019 B2 | 8/2011 | Sung |
| 8,169,109 B2 | 5/2012 | Sykes et al. |
| 8,710,711 B2 | 4/2014 | Pennander et al. |
| 8,963,508 B2 | 2/2015 | Frampton et al. |
| 2004/0090134 A1 | 5/2004 | Ide et al. |
| 2005/0218740 A1 | 10/2005 | Stout et al. |
| 2007/0222220 A1 | 9/2007 | Huang et al. |
| 2007/0227470 A1 | 10/2007 | Cole et al. |
| 2010/0295301 A1 | 11/2010 | Huang et al. |
| 2011/0006545 A1 | 1/2011 | Himmelmann |
| 2011/0012447 A1 | 1/2011 | Himmelmann |
| 2011/0241465 A1 | 10/2011 | Anghel et al. |
| 2012/0186063 A1 | 7/2012 | Himmelmann |
| 2013/0292941 A1 | 11/2013 | Mountain et al. |
| 2016/0025023 A1 | 1/2016 | Kim |

FOREIGN PATENT DOCUMENTS

| | | |
|---|---|---|
| CN | 101958609 A | 1/2011 |
| DE | 3601193 A1 | 7/1987 |
| EP | 2372880 A2 | 10/2011 |
| EP | 2273656 A3 | 10/2013 |

OTHER PUBLICATIONS

European Search Report for European Application No. 16173100.5-1809, dated Mar. 17, 2017.
European Office Action for European Application No. 16173100.5-1201 dated Apr. 29, 2019.
Chinese Office Action for Chinese Application No. 2016103977506 dated Jun. 3, 2019.
European Office Action for European Patent Application No. 16 173 100.5-1201 dated Apr. 6, 2020.
India Examination Report for India Patent Application No. 201624019312 dated Jun. 26, 2020.

DUAL AXIS ALTERNATOR

CROSS REFERENCE TO OTHER APPLICATIONS

This application is a continuation under 35 U.S.C § 120 and 37 C.F.R. § 1.53(b) of U.S. patent application Ser. No. 14/732,829 filed Jun. 8, 2015, of which is hereby incorporated by reference in its entirety.

FIELD

This application relates to the field of alternators, and more specifically, a dual axis alternator for a flywheel of an engine.

BACKGROUND

An engine-generator set, which may be referred to as a generator or a genset, may include an engine and an alternator or another device for generating electrical energy or power. One or more generators may provide electrical power to a load through a power bus. The power bus, which may be referred to as a generator bus or common bus, transfers the electrical power from the engine-generator set to a load.

The generator may include a rotating part, rotor, and a stationary part stator. The armature, which can be part of the rotor or the stator, is the electric producing portion (e.g., coils of wire) for producing time varying voltage. The field produces a magnetic field that causes the time varying voltage to be produced when the rotor moves relative to the stator. The field may be in either the rotor or the stator and opposite to the armature.

A separately excitable generator also includes an exciter generator for producing a field current for the magnetic field. The separate exciter generator takes up space. Depending on the design and package, the exciter may extend the length of the genset from 5-30%. In many applications, this space is not available this space could be used in other ways.

BRIEF DESCRIPTION OF THE DRAWINGS

Exemplary embodiments are described herein with reference to the following drawings.

DETAILED DESCRIPTION

Controlled-field synchronous generators include an exciter for generating a field current. As the exciter armature is rotated in a magnetic flux, a time varying voltage is induced in the windings of the exciter armature. The output from the exciter armature is connected to the main field portion of generator. The connection may be made without brushes and slip rings. The field current of the output of the exciter provides a magnetic field in rotor field of the generator. As the field portion of the alternator is rotated relative to the stator, a magnetic flux is passed through and across the alternator stator windings producing time varying voltage.

The field current from the exciter armature output may be rectified or otherwise controlled. The generator may include various modes of control for the field current. The controlled field generators are flexible in electrical operation but require significant space. The exciter portion and the main portion may be supported and rotated by a common shaft. The exciter portion and the main portion may be spaced axially apart on the common shaft. This design requires significant space to allow for the exciter portion and the main portion to be spaced axially apart.

Other designs improve on the space requirements. A permanent magnet generator (PMG) has a rotor field that is provided by permanent magnets. The rotating part, or rotor, rotates about the center of the generator, and the stationary part, or stator, includes coils for generating voltage when the rotor is rotated relative to these coils. The generator is described as synchronous generator because the frequency of the electrical output is directly proportional to the angular speed (e.g., revolutions per minute) of the rotor.

The permanent nature of the permanent magnets in the PMG leads to several disadvantages. First, because the magnets cannot be "turned off," safety issues arise during assembly or maintenance of the PMG. More significantly, the PMG design is less flexible than other designs. The following embodiments provide the space advantages of the PMG in combination with the control flexibility of controlled field generators.

The following embodiments include a dual axis generator. In a dual axis generator, the exciter generator and the main generator are arranged concentrically in the same plane around the common shaft. Because the exciter generator and the main generator are arranged concentrically, the amount of space required in the axial direction is much less. Because the generator has a controlled field, the dual axis generator provides control flexibility in a space similar to a PMG.

Figure 1:
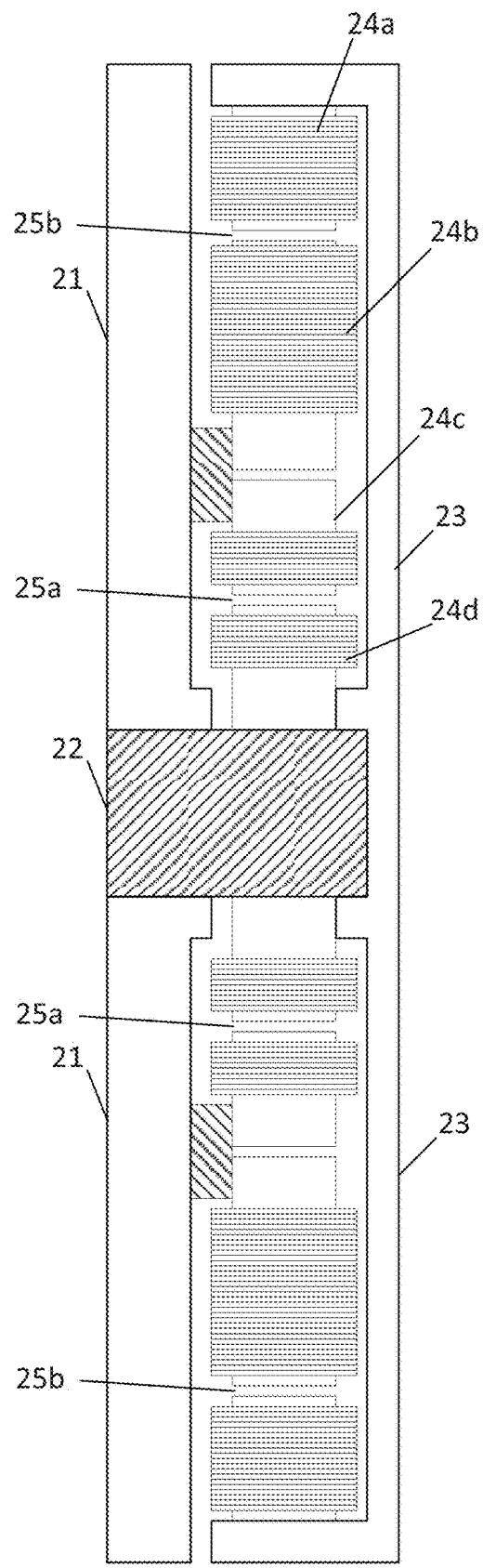
FIG. 1 illustrates an example side view of a dual axis generator.

FIG. 1 illustrates an example side view of a dual axis generator. A shaft 22 supports a rotor frame 23. A stator frame 21 is supported by a fixed member that provides the frame of reference for the rotating rotor. The fixed member may be an engine block or skid or other fixed member. The rotor frame 23 rotates with the shaft. The rotor frame 23 supports a rotor field device 24a and an exciter armature device 24d. Thus, the rotor field device 24a and the exciter armature device 24d may be rigidly mounted together or integrally formed. The stator frame 21 supports an exciter field device 24c, and a main stator device 24b. Thus, the exciter field device 24c and the main stator device 24b are rigidly mounted in the same frame of reference relative to the rotor or may be integrally formed. Either or both of the stator side and the rotor side may be formed of cast iron or steel or laminated silicon steel or other magnetically permeable materials An exciter air gap 25a is maintained between the exciter field device 24c and the exciter armature device 24d. The exciter field device 24c is energized by a voltage regulator or another power source to generate an exciter magnetic field in the exciter air gap 25a. The exciter armature device 24d is configured to rotate with respect to the exciter field device 24c and impart a first time varying voltage in a set of coils in the exciter armature across the exciter air gap 25a. In one alternative, the exciter field device 24c may include permanent magnets. In another alternative, the exciter field device may include coils or another magnetic field generating device.

A main air gap 25b is maintained between the rotor field device 24a and the main stator device 24b. The main stator device 24b including a second set of coils. The rotor field device 24a is configured to be energized by the first current in the first set of coils and generate a main magnetic field that imparts a second time varying voltage in the coils of the main stator device 24b across the main air gap 25b.

As illustrated in FIG. 1, the main stator device 24b and the exciter field device 24c lie in on a common plane normal to an axis of rotation of the shaft 22. In a first embodiment, only the main stator device 24b and the exciter field device 24c lie in on the common plane with the rotor field device 24a and the exciter armature device 24d lying in an adjacent plane. In this example, the adjacent plane including the rotor field device 24a and the exciter armature device 24d are axially spaced from the main stator device 24b and the exciter field device 24c. In this embodiment, the main air gap 25b and the exciter air gap 25a lie in adjacent planes or a common plane normal to the shaft. In a second embodiment, the main stator device 24b, the exciter field device 24c, the rotor field device 24a and the exciter armature device 24d lie in the common plane. In this embodiment, the main air gap 25b and the exciter air gap 25a may be concentrically aligned parallel to the axis of the shaft 22 with all or part of the cylindrical exciter air gap 25a contained within the cylindrical main air gap 25b. Note combinations of the first and second embodiments are possible and contemplated.

The exciter armature device 24d is inwardly spaced from the exciter field device 24c, main stator device 24b, and the rotor field device 24a. In other words, the exciter armature device 24d is closer to the shaft 22 than the exciter field device 24c, the main stator device 24b, and the rotor field device 24a. As shown in the embodiment of FIG. 1, the exciter armature device 24d is closest to the shaft, followed by the exciter field device 24c, then the main stator device 24b, and finally the rotor field device 24a. Thus, the rotor field device 24a is radially and outwardly spaced from the exciter armature device 24d, the exciter field device 24c, and the main stator device 24b. Embodiments where the rotor field device 24a is inwardly spaced from the main stator device 24b are also contemplated.

Figure 2:
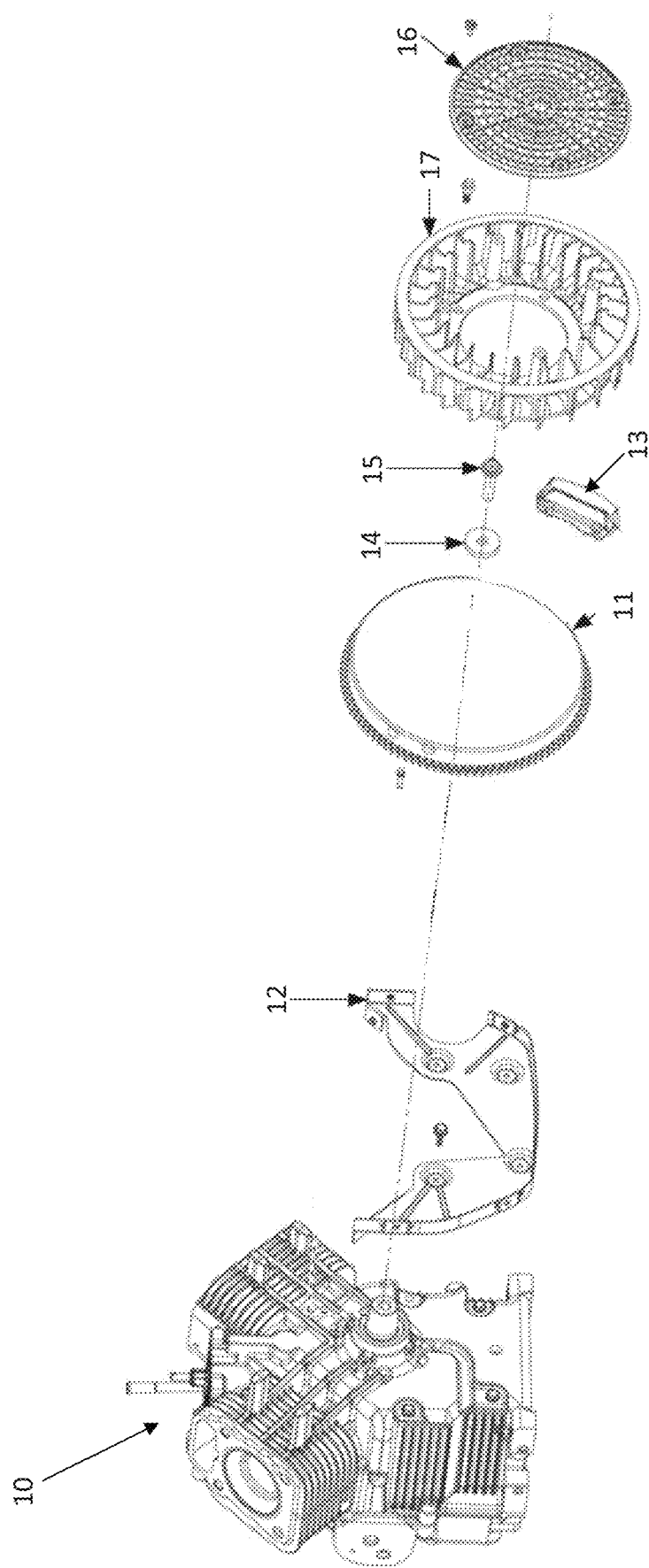
FIG. 2 illustrates an example exploded view of an engine including a dual axis generator.
Figure 3:
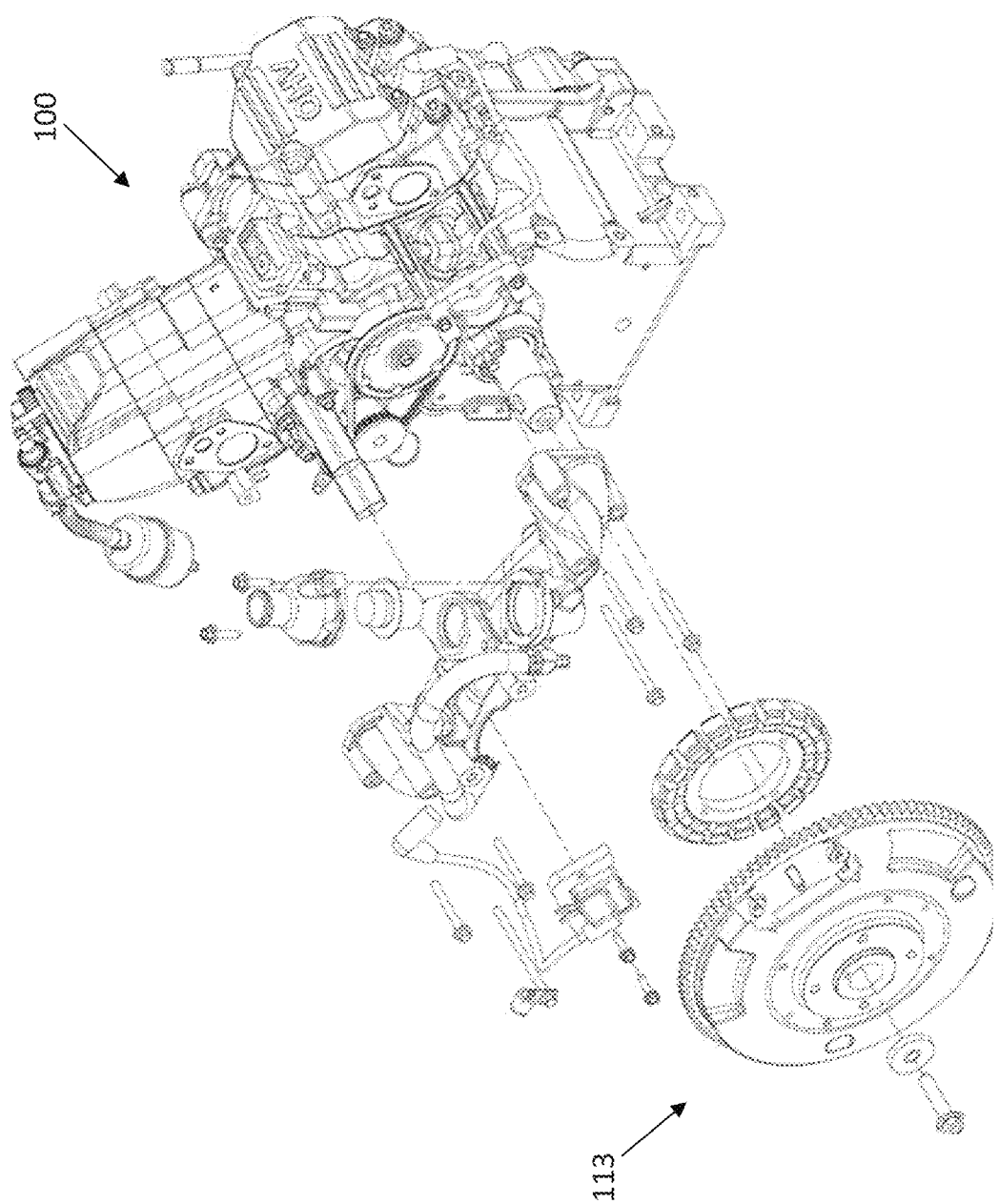
FIG. 3 illustrates an example exploded view of an engine including a dual axis generator.

FIG. 2 illustrates an example exploded view of an air cooled engine 10 including a dual axis generator. The engine 10 includes a flywheel 11, a backing plate 12, an ignition module 13, a flywheel washer 14, a flywheel screw 15, a debris screen 16, a fan 17, and electrical connector 18. FIG. 3 illustrates an example exploded view of a liquid cooled engine 100 including a dual axis generator. Additional, different, or fewer components may be included.

Either flywheel 11, 111 is mechanically coupled to a prime mover of the engine 10 or 100, respectively. The flywheel 11, 111 stores energy produced by the engine 10. The engine includes one or more pistons that perform a series of strokes. The flywheel 11, 111 stores energy from the prime mover, through momentum and inertia, from one or more of the series of strokes and delivers to energy to the prime mover in another one or more of the series of strokes.

Consider an example in which a compression cycle of the engine 10 includes an intake stroke, a compression stroke, a power stroke, and an exhaust stroke. During the intake stroke, the piston moves from the top of the cylinder to the bottom of the cylinder. A fuel and air mixture is drawn into the cylinder. Next, during the compression stroke, the piston moves back to the top of the cylinder, compressing the fuel and air mixture against the cylinder head. Next, during the power stroke, the compressed fuel and air mixture is ignited by a spark plug, compression, or heat source. The piston is pushed back down toward the bottom of the cylinder by the pressure generated from combustion. Finally, during the exhaust stroke, the piston returns to the top of the cylinder to expel the spent or combusted fuel and air mixture through an exhaust valve.

During the power stroke, the flywheel 11, 111 receives momentum from the crankshaft. As the piston ends the power stroke, the flywheel 11, 111 provides momentum to continue through the exhaust stroke, intake stroke and compression strokes. The flywheel 11, 111 reduces fluctuations in the speed of the engine by resisting both acceleration during the power stroke, and deceleration during the other strokes. The inertia of the flywheel 11, 111 may also reduce fluctuations in the speed of the engine 10, 100 when the load varies.

The engine 10, 100 may require a flywheel 11, 111 to provide a moment of inertia at a predetermined level. Requirements for moments of inertia for the flywheel 11, 111 may vary according to the firing frequency of the engine, the number of cylinders or other characteristics of the engine. The exciter armature device 24d and the rotor field device 24a may be integrated in the flywheel 11, 111 of the engine 10, 100 while the exciter field device 24c and the main stator device 24b may be contained within the flywheel 11, 111. Because the dual axis alternator may be integrated with the flywheel 11, 111, the moment of inertia of the flywheel 11, 111 may be different than in other types of engines. The moment of inertia may be increased with greater mass from the exciter armature device 24d and the rotor field device 24a. A dual purpose may be achieved in decreasing the torque variation of the engine 10, 100 via the flywheel 11, 111 including the moment of inertia of the rotor field and exciter armature laminations and coils. The rotor field and exciter armature may also be wound on a casting of the flywheel 11, 111, which may be formed cast iron, steel, or another magnetically permeable material.

In the air cooled example, an ignition module 13 may use a pickup to generate energy and a signal from the passing of a magnet for generating an electric spark to one or more cylinders of the engine 10 at an appropriate time. The ignition module 13 may be spaced by a distance from the rotor field on the flywheel 11 in order to prevent interference between the rotor field and the ignition magnet. The ignition module 13 may be in a different place than the flywheel 11. The flywheel 11 may be secured to the engine 10 by the flywheel washer 14 and the flywheel screw 15 fastening to the backing plate 12. The fan 17 is driven by the flywheel and forces air onto the flywheel 11 and or other components of the engine 10 in order to cool the engine 10. The debris screen 16 catches any foreign matter from being blown by the fan 17 into the engine 10.

The liquid cooled engine 100 may include an engine block 101, cylinder heads 102, intake manifold 103, throttle body 104, crank angle sensor 105, ignition module 106, starter motor 107, starter solenoid 108, flywheel cover 109, access cover 110, and flywheel 111. Other embodiments may not include the starter motor 107 or starter solenoid 108, if the dual axis generator is used to crank the engine.

The liquid-cooled engine 100 may reduce the temperature of the engine block, cylinder head, and other components of the engine by exchanging heat into a liquid coolant. The liquid coolant can be pumped to convey the heat away from the engine components and into another heat exchanger to be dissipated into another cooling fluid or heat sink. The liquid coolant may be a glycol-water mixture, alcohol, water, or another coolant. The other heat exchanger may include a liquid to air heat exchanger (e.g. a radiator), a liquid to liquid heat exchanger (e.g. a seawater heat exchanger), or a large metal heat sink (such as the keel or hull of a ship).

Figure 4:
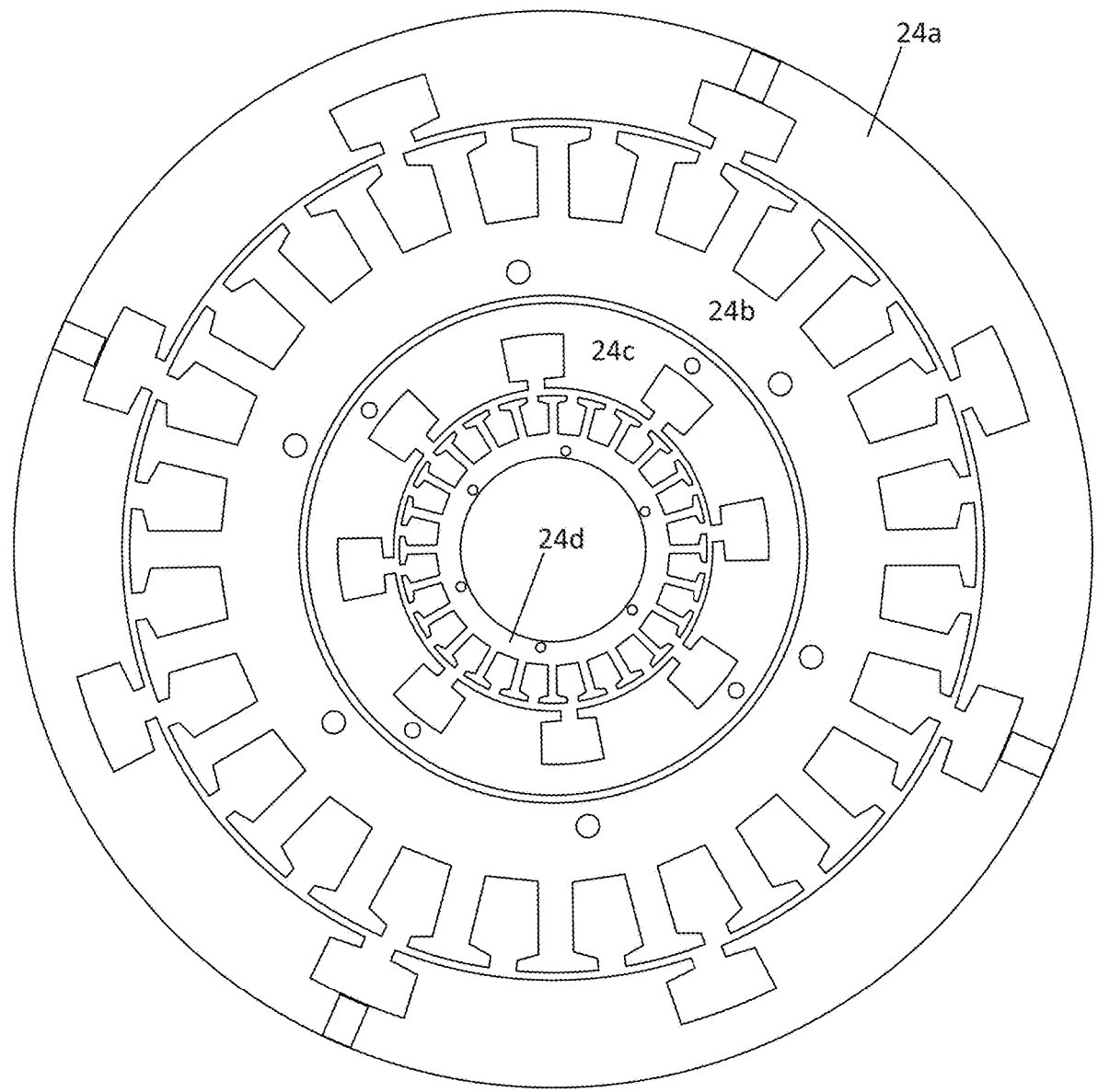
FIG. 4 illustrates an example cross section of a dual axis generator.

FIG. 4 illustrates an example cross section including the magnetic material of a radial air gap dual axis generator. Because of the layout of the machine, the power density is optimized. That is the main (field and stator) devices are larger than the exciter devices. For example, the exciter field device 24c is larger than the exciter armature device 24d, and the rotor field device 24a is larger than the main stator device 24b. The main stator device 24b and the exciter armature device 24d have a high number of teeth (e.g., 24), and the rotor field device 24a and the exciter field device 24c have a low number of teeth (e.g., 8). Each tooth may support a winding.

This is an optimized machine topology because the rotor field device 24a and the main stator device 24b may require more air gap area to generate output current to the load relative to the current provided by the exciter field device 24c and the exciter armature device 24d to the rotor field device 24a.

Figure 5A:
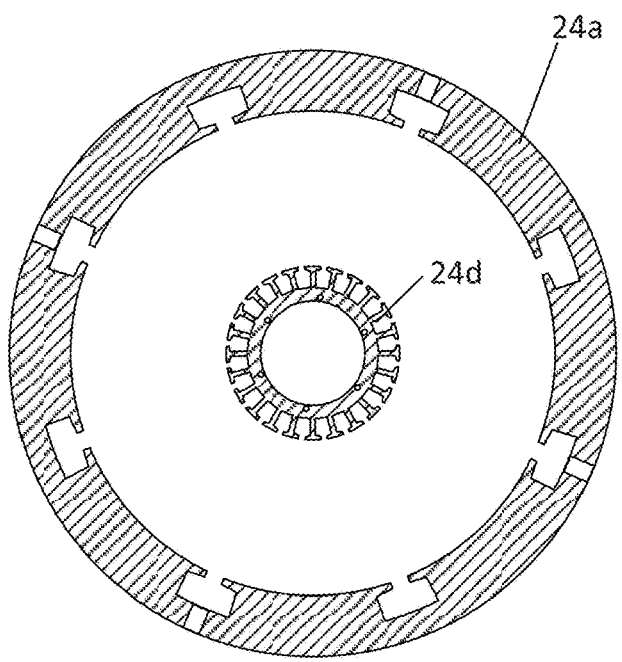
FIG. 5A illustrates a stationary portion of a dual axis generator.
Figure 5B:
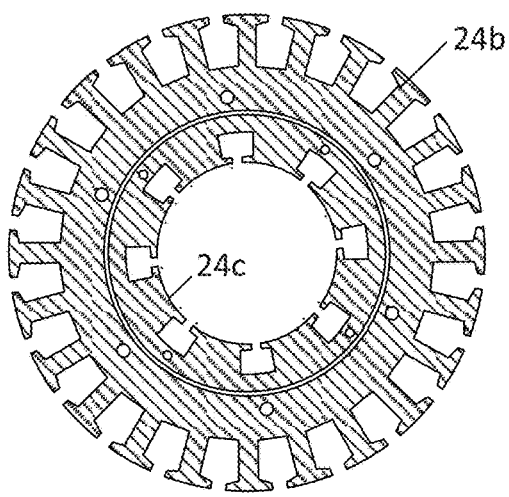
FIG. 5B illustrates a moving portion of a dual axis generator.

FIG. 5B illustrates a stationary portion of a dual axis generator. The rotor field device 24a and the exciter armature device 24d may be rigidly mounted together or integrally formed as the stationary portion. FIG. 5A illustrates a moving portion of a dual axis generator. The exciter field device 24c and the main stator device 24b are rigidly mounted together or integrally formed as the moving portion.

Figure 6:
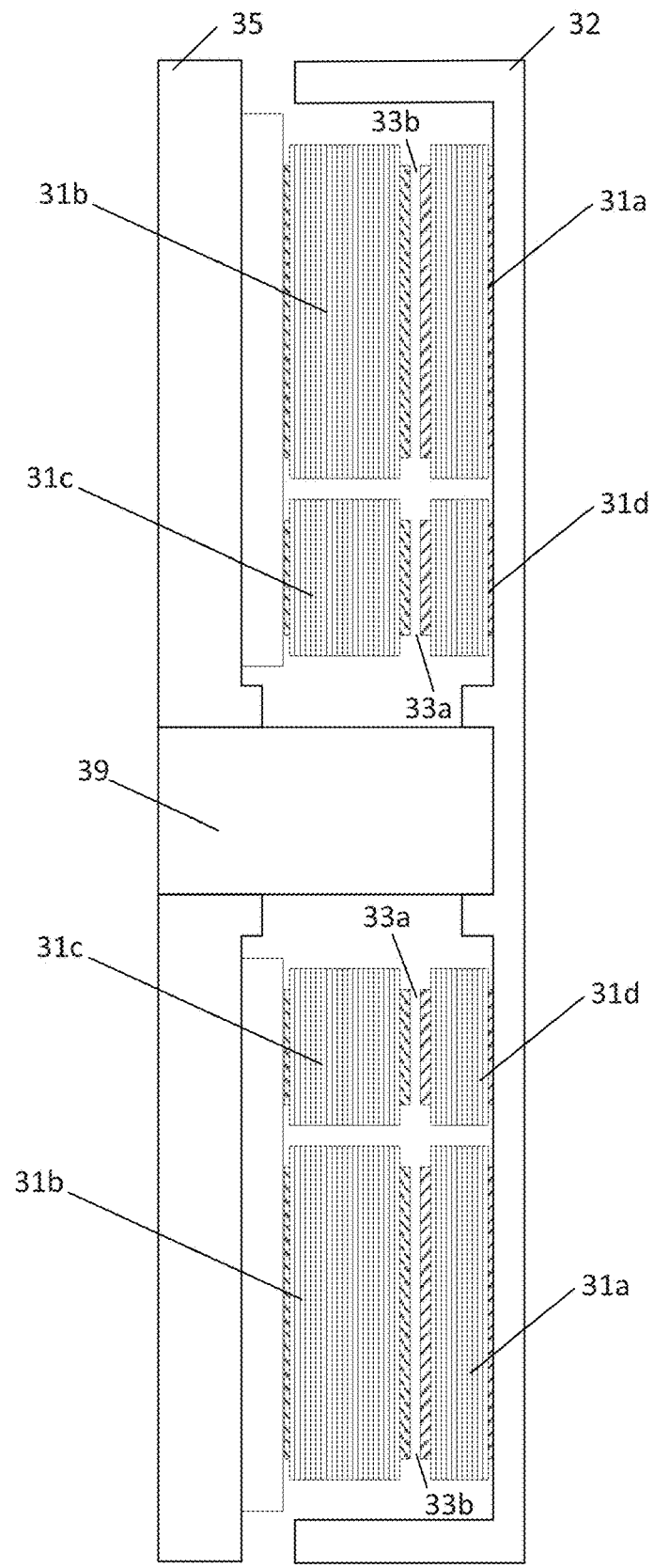
FIG. 6 illustrates an axial embodiment of a dual axis generator.

FIG. 6 illustrates an axial embodiment of a dual axis generator. The axial dual axis generator includes a stator frame 35 and a rotor frame 32. A shaft 39 supports the rotor frame 32. The stator frame 35 is attached to a fixed member. The rotor frame 32 rotates with the shaft 39. The rotor frame 32 supports a rotor field device 31a and an exciter armature device 31d. Thus, the rotor field device 31a and the exciter armature device 31d may be rigidly mounted together or integrally formed.

The stator frame 35 supports an exciter field device 31c and a main stator device 31b. Thus, the exciter field device 24c and the main stator device 24b are rigidly mounted together or integrally formed. Either or both of the stator side and the rotor side may be formed of cast iron or steel or other magnetically permeable material. The coils may be wrapped on the cast iron, or, in an alternative embodiment, the coils may be integrated in a printed circuit board.

An exciter air gap 33a is maintained between the exciter field device 31c and the exciter armature device 31d. The exciter field device 31c generates an exciter magnetic field in the exciter air gap 33a. The exciter armature device 31d is configured to rotate with respect to the exciter field device 31c and impart a first time varying voltage in a set of coils at the exciter air gap 33a.

A main air gap 33b is maintained between the rotor field device 33a and the main stator device 31b. The main stator device 31b includes a second set of coils. The rotor field device 31a is configured to be energized by the first current in the first set of coils and generate a main magnetic field that imparts a second time varying voltage on the main stator device 31b at the main air gap 33b.

As illustrated in FIG. 6, the main stator device 31b and the exciter field device 31c lie in on a first common plane normal to an axis of rotation of the shaft 39. The common plane extends in directions normal to the shaft 39. The rotor field device 31a and the exciter armature device 31d are in a second common plane axially spaced (e.g., in the longitudinal direction of the shaft 39) from the main stator device 31b and the exciter field device 31c in the first common plane. In the axial dual axis generator, the exciter armature device 31d is inwardly spaced, toward the center of rotation, from the exciter field and the rotor field device 31a. In addition, the exciter field device 24c in inwardly spaced from the main stator device 31b.

Figure 7:
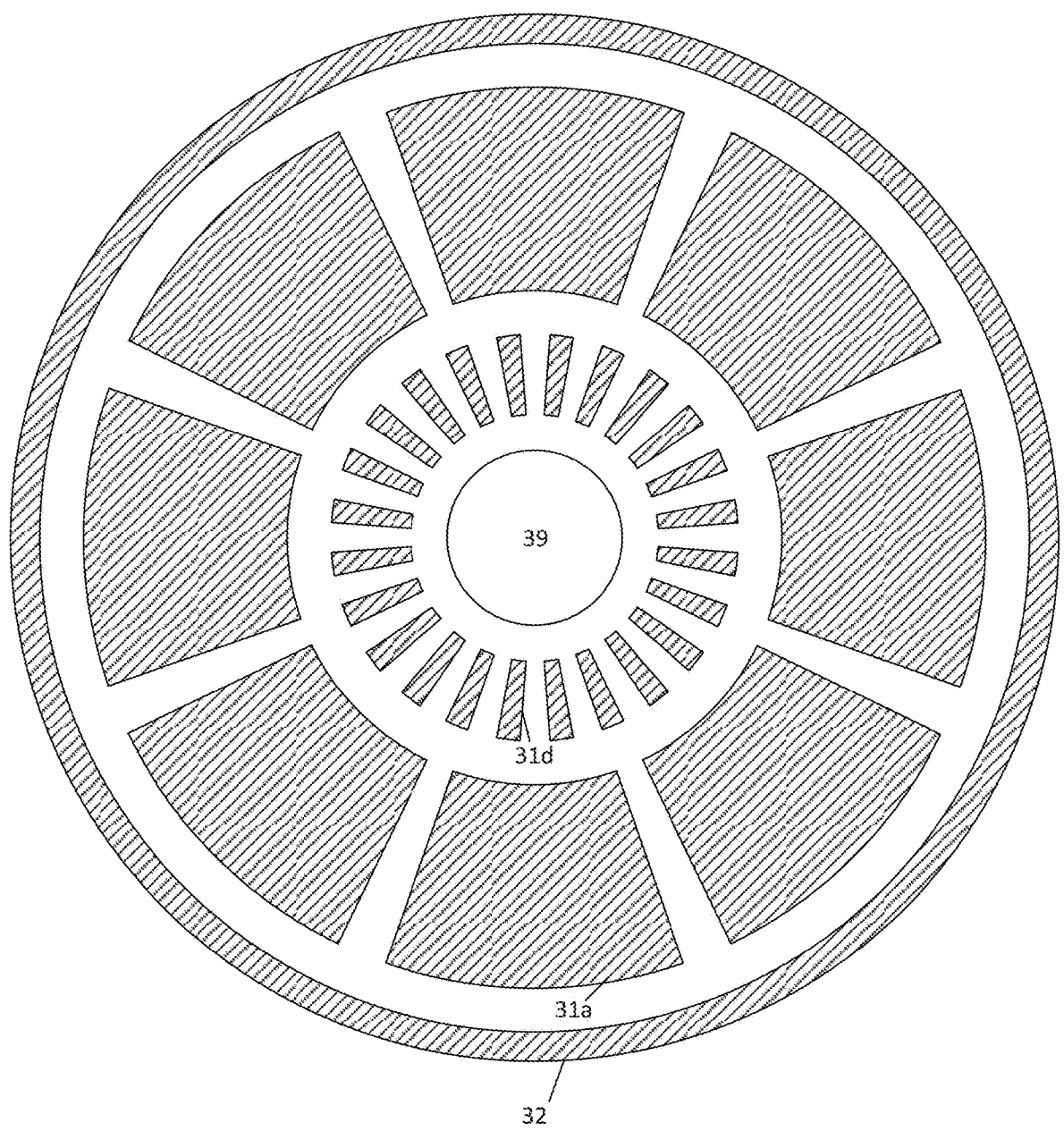
FIG. 7 illustrates a cross section of a rotor portion of the axial embodiment.
Figure 8:
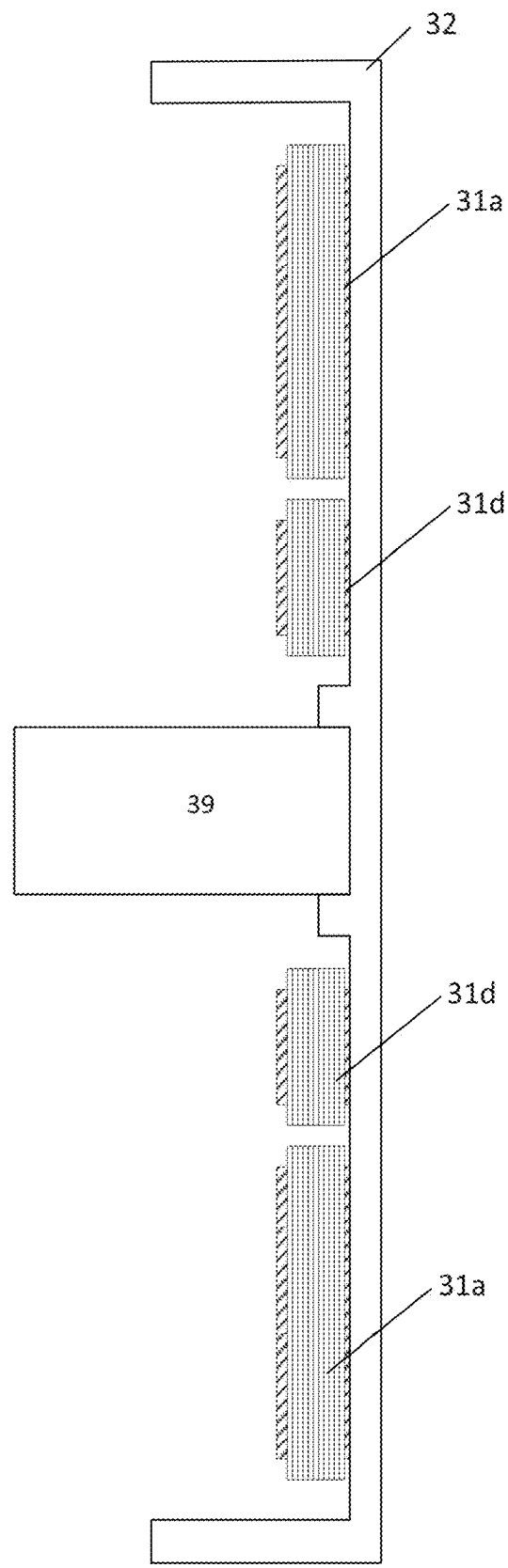
FIG. 8 illustrates a side view of a rotor portion of the axial embodiment.

FIG. 7 illustrates a cross section of the rotor frame 32 of the axial embodiment, and FIG. 8 illustrates the side view of only the rotor frame 32. The rotor frame 32 rotates with the shaft 39. The rotor frame 32 supports a rotor field device 31a and an exciter armature device 31d. Thus, the rotor field device 31a and the exciter armature device 31d may be rigidly mounted together or integrally formed.

Figure 9:
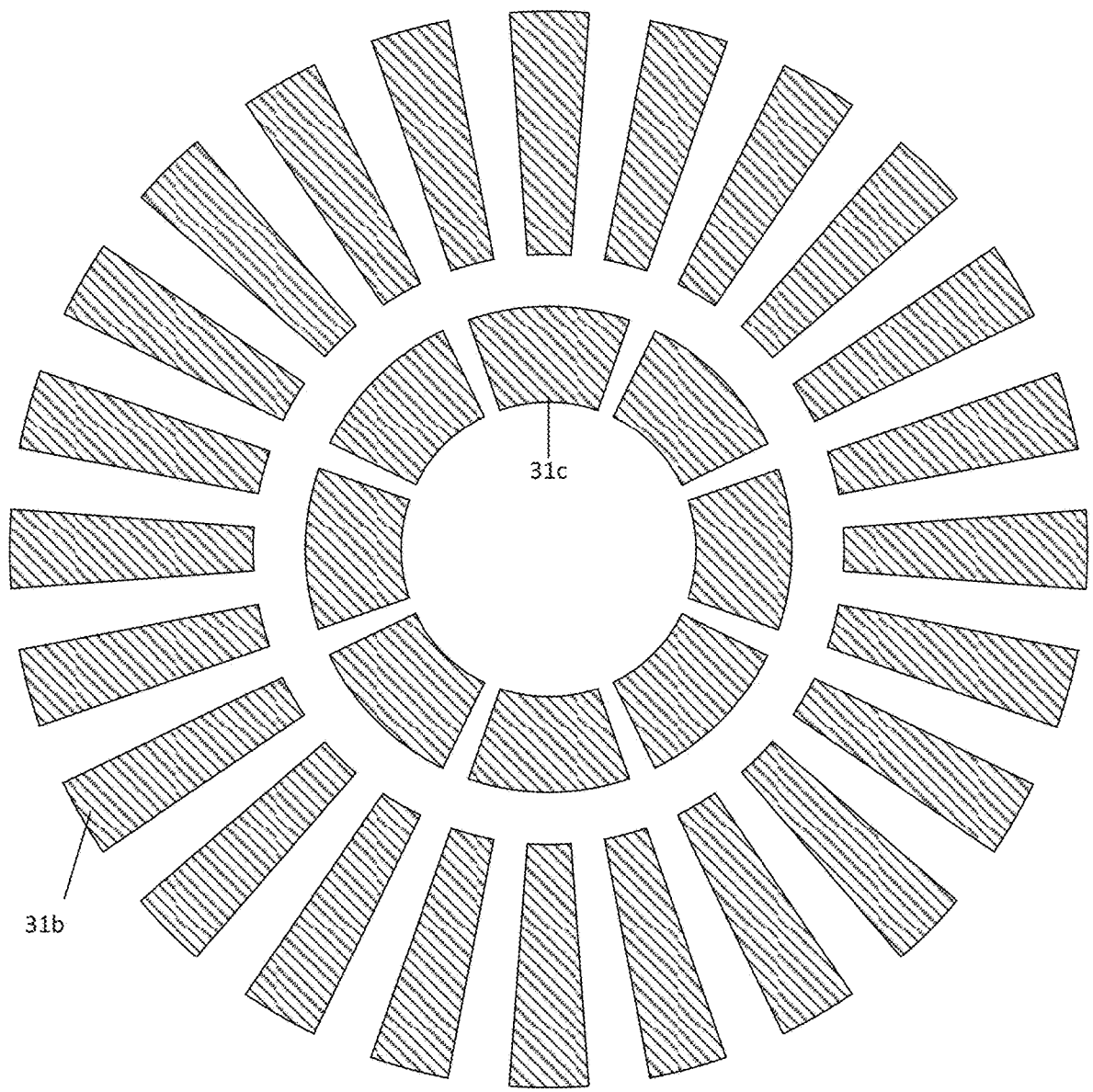
FIG. 9 illustrates a cross section of a stator portion of the axial embodiment.
Figure 10:
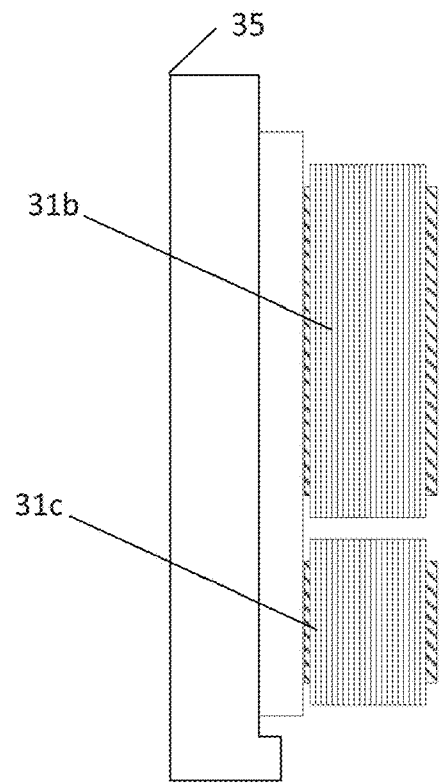
FIG. 10 illustrates a side view of a stator portion of the axial embodiment.
Figure 10:
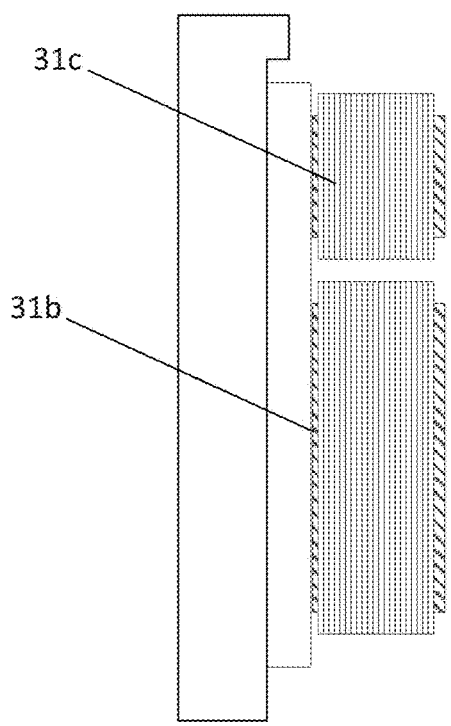

FIG. 9 illustrates a cross section of stator frame 35 of an axial embodiment, and FIG. 10 illustrates a side view of the stator frame 35 of the axial embodiment. The stator frame 35 supports the exciter field device 31c and the main stator device 31b. The axial embodiment may reduce the overall length of the machine. Cooling may be improved because the iron is directly connected to the engine block. If less iron is between the engine block and the windings, heat may be dissipated more efficiently. The axial embodiment may be easier to manufacture because it can be wound from one end with rotating the machine. Finally, less permanent magnet material may be required in cases where the exciter utilizes a permanent magnet field.

Figure 11:
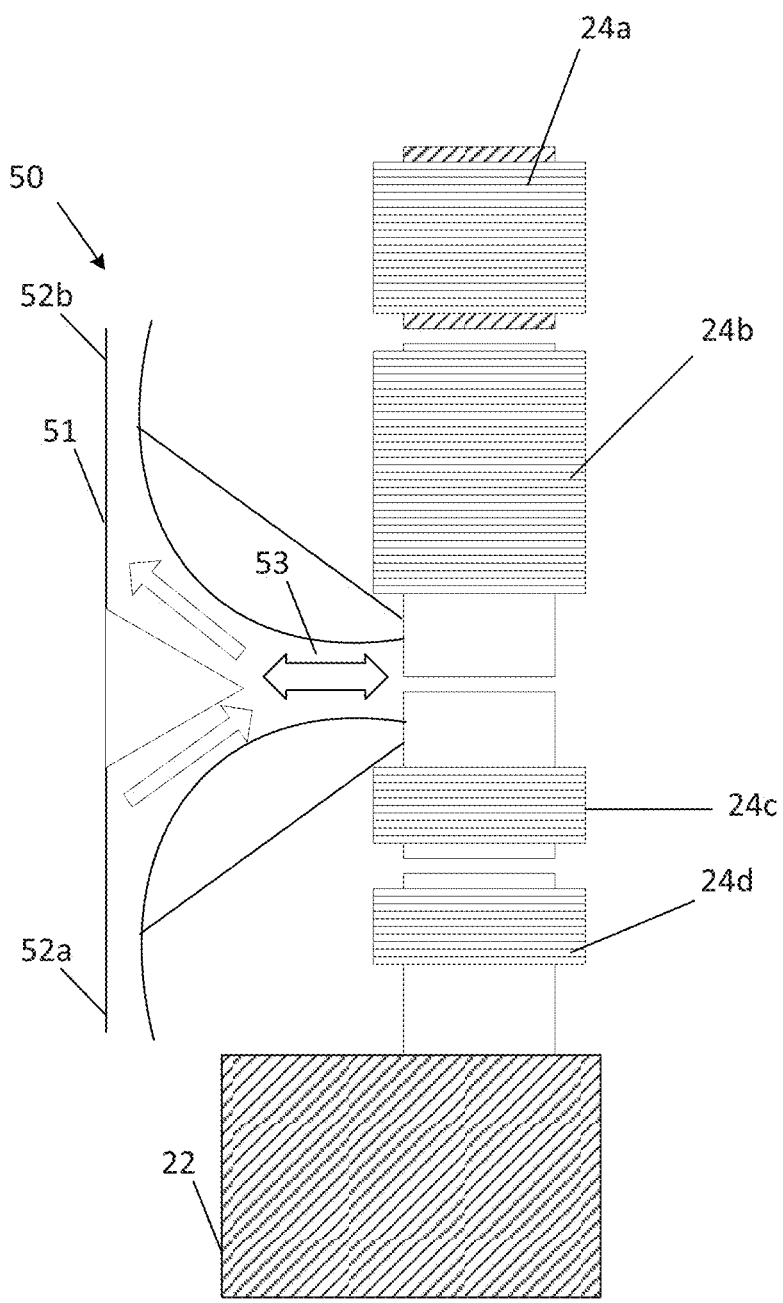
FIG. 11 illustrates a coolant system of a dual axis generator.

FIG. 11 illustrates a coolant system 50 of a dual axis generator. While illustrated with the example of FIG. 1, the coolant system 50 may also be applied to any of the examples described herein including the axial embodiment. The coolant system 50 may include a coolant passage 51. As shown by the arrows, a coolant flows from an input end 52a to an output end 52b of the coolant passage 51. The coolant may be any type of gas or fluid such as air, water, seawater, antifreeze, methanol, ethyl alcohol, nitrogen, or another coolant. The coolant passage 51 may carry the coolant to a cavity 53 that is in contact with the exciter field device 24c and/or the main stator device 24b. In other examples, the coolant passage 51 and/or the cavity 54 may be in contact with the exciter armature device 24d and/or the main stator devices 24a.

The dual axis generator may include a variety of coolant passages. The coolant passages may pass through the interior of the flywheel. The coolant passages may pass through the laminations of the dual axis generators. The coolant passage may pass through any combination of the exciter field device 24c, the main stator device 24b, the exciter armature device 24d and/or the rotor field device 24a.

Figure 12:
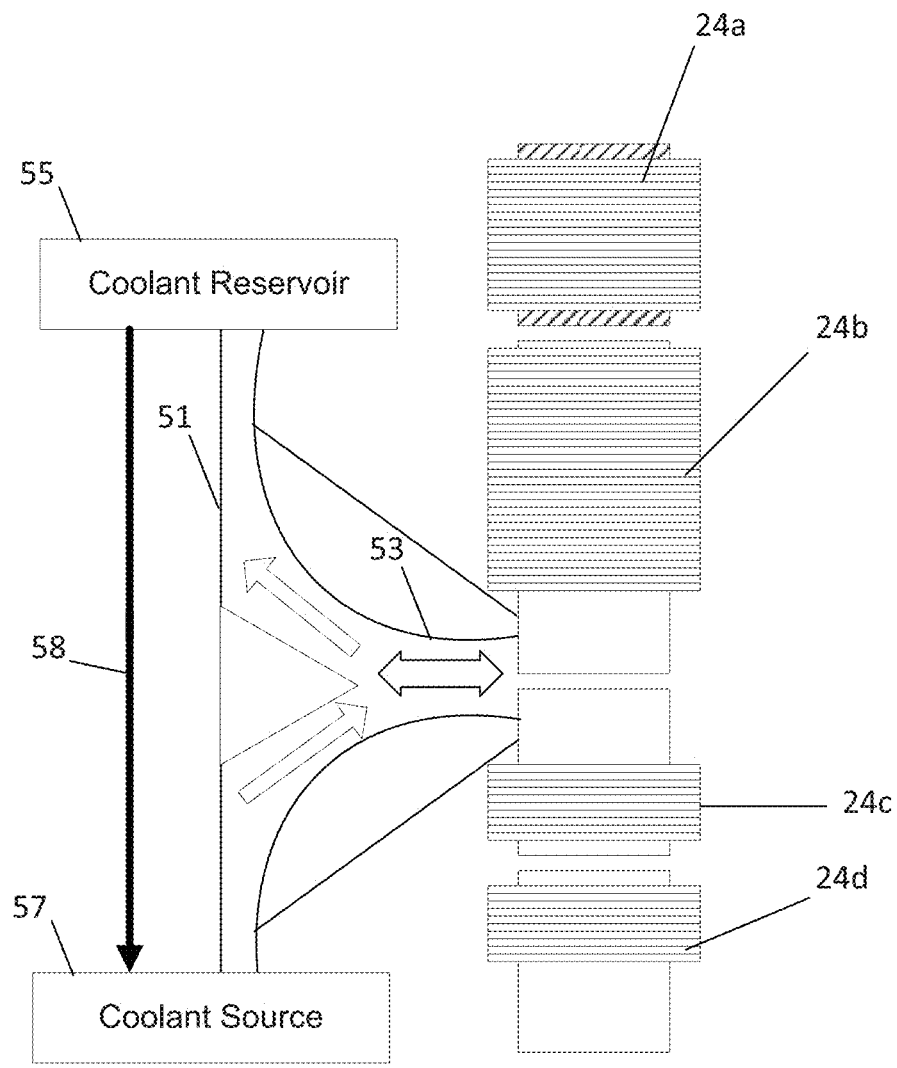
FIG. 12 illustrates another embodiment of a coolant system of a dual axis generator.

FIG. 12 illustrates another example of a coolant system 50 of a dual axis generator. The coolant passage 51 in this example, carries the coolant from a coolant source 57 to the cavity 53 that is in contact with the exciter field device 24c and/or the main stator device 24b and then to a coolant reservoir 55. A return line 58 may return the coolant from the coolant reservoir 55 to a coolant source 57. The return line 58 may be plumbing such as a pipe or plastic tubing. The return line 58 or the coolant passage 51 may include a pump for pumping the coolant to or away from the dual axis generator.

In one example, the arrangement of the coolant system 50 in FIG. 12 may be the coolant system of the engine 100. In other words, the engine 100 includes a coolant system for passing coolant through any combination of a radiator, a pump, an engine blocks, and cylinder heads of the engine 100. The coolant passage 51 may be part if this coolant route. Thus, the engine 100 and the dual axis generator may include a common coolant passage with the engine 100.

In one example, the coolant system of the engine 100 may be independent from the coolant system 50 of the dual axis generator. That is, none of the plumbing of the coolant system of the engine 100 is connected to the plumbing of the coolant system 50 of the dual axis generator. The coolant system of the engine 100 may include a first reservoir, and the coolant system 50 of the dual axis generator may include a second reservoir.

In one example, the arrangement of the coolant system 50 in FIG. 12 may utilize an external source. For example, the coolant source 57 may be a source of coolant outside of the dual axis generator and the engine 100. In one example, the dual axis generator is used in a marine application, and the coolant source 57 is an ocean, lake, or river. In this example, the coolant may be freshwater or seawater. The freshwater or seawater may be delivered from the coolant source 57 to one or more components of the dual axis generator and then return directly or indirectly through the coolant reservoir 55 or the return line 58.

Figure 13:
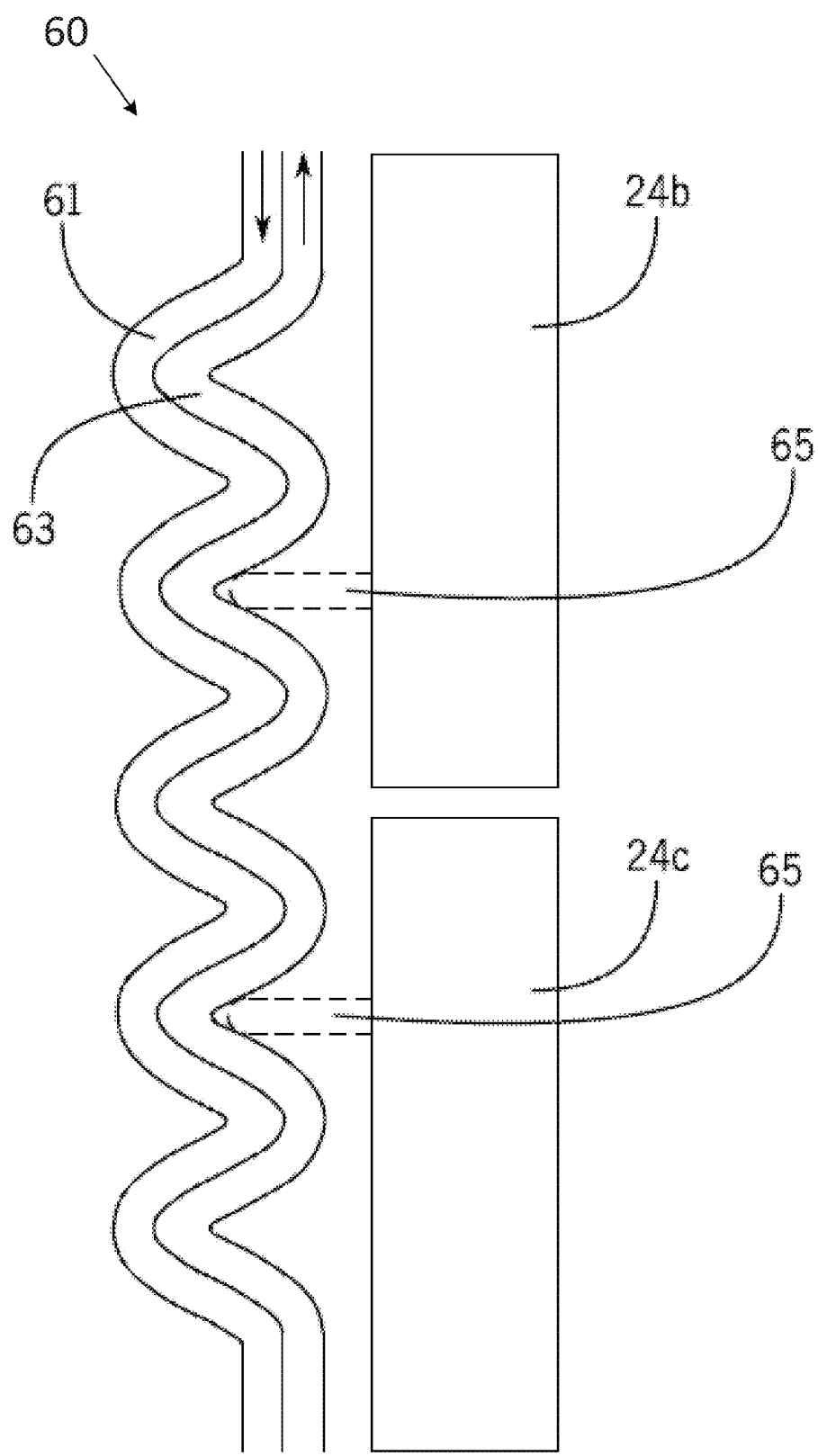
FIG. 13 illustrates a heat exchanger for a coolant system of a dual axis generator.

FIG. 13 illustrates a heat exchanger 60 for a coolant system of a dual axis generator. The heat exchanger 60 includes a secondary conduit 61 and a primary conduit 63. In one example, a set of conductive supports 65 may conduct heat from the exciter field device 24c and/or the main stator device 24b to the secondary conduit 63. In another example, the secondary conduit 63 may be exposed to the exciter field device 24c and/or the main stator device 24b. In other examples, the heat is transferred through a compressed interface between the exciter field device 24c and the main stator device 24b and through the engine block to the secondary conduit 63, which may be contained in the engine block.

The primary conduit 63 may include any of the fluids described above (e.g., water, seawater, or another fluid), which may be referred to as a first coolant. Heat is absorbed from the exciter field device 24c and/or the main stator device 24b through the conductive supports 65 to the primary conduit 63, or alternatively directly from the first coolant to the exciter field device 24c and/or the main stator device 24b. Heat from the first coolant may be absorbed from a second coolant in the secondary conduit 61. The coolant in the secondary conduit 61 may be released into the environment and sourced from the environment. In one example, the coolant in the secondary conduit 61 is seawater from a nearby body of water. The heat exchanger 60 prevents the seawater from contaminating or damaging the dual axis generator or the engine 100. The seawater may have a temperature lower than other coolants regulated by a thermostat. An example maximum temperature for seawater may be 35 C and an example maximum temperature for other coolants may be 110 C. The exciter field device 24c and the main stator device 24b may have passages for either coolant that may be lined with a thermally conductive and corrosion resistant material.

Figure 14:
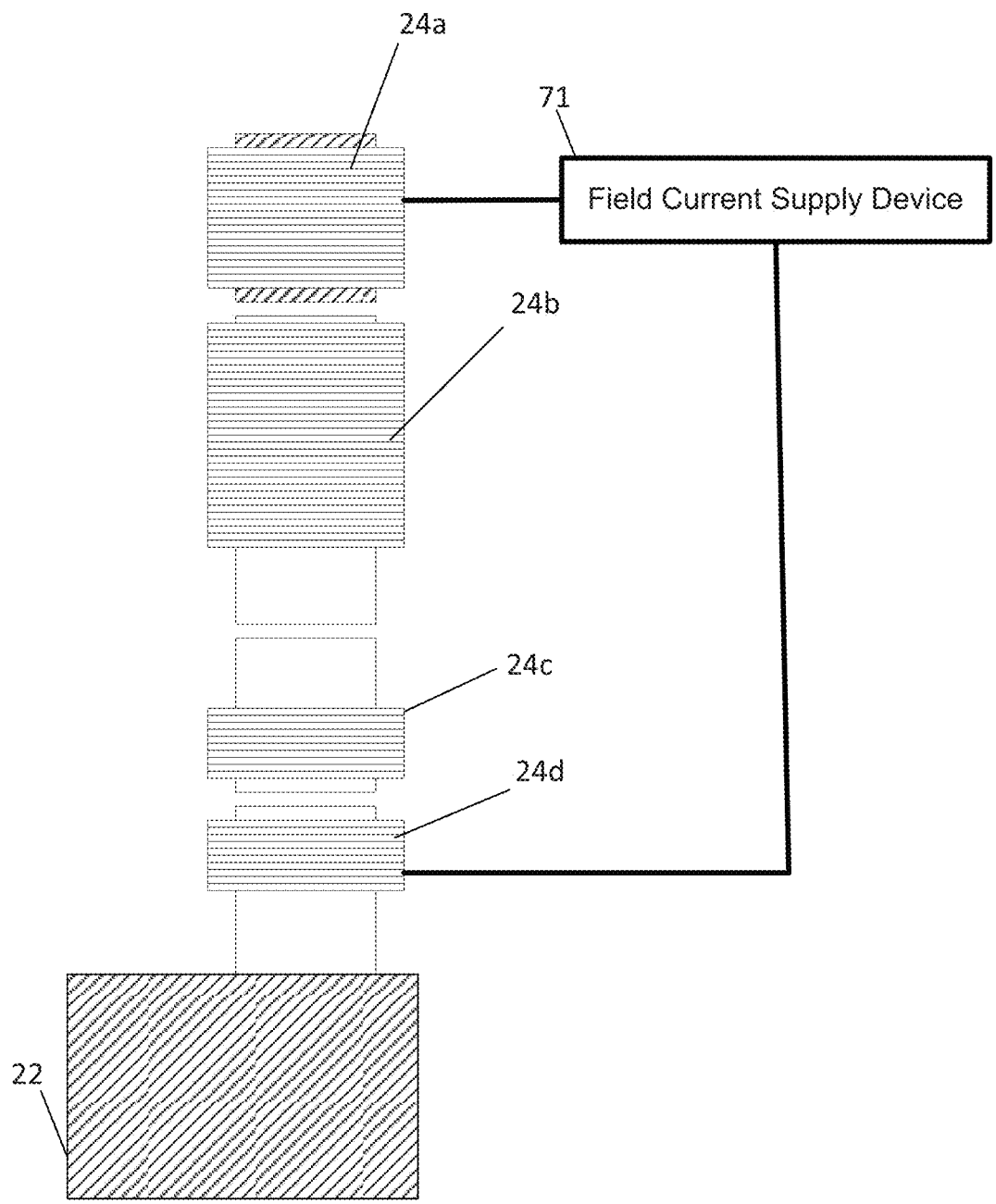
FIG. 14 illustrates an example field current supply device for the dual axis generator.

FIG. 14 illustrates an example field current supply device 71 for the dual axis generator. The field current supply device 71 may be a rectifying device configured to convert the first current in the first set of coils of the exciter armature device 24d into a rectified signal supplied to the rotor field device 24a. The field current supply device 71 may be a controlled rectifier with digital logic or circuitry to convert the signal of the exciter armature device 24d to be suitable for the rotor field device 24a. The field current supply device 71 may convert the alternating current in the exciter armature device 24d to a rectified or direct current suitable for the rotor field device 24a.

In another example, the field current supply device 71 is an analog circuit. The analog circuit may accept a single phase or three phase input from the exciter armature device 24d. The analog circuit may provide a DC voltage to the rotor field device 24a. An example of the analog circuit may be a diode rectifier, and another example for the analog circuit may be a controlled rectifier. The controlled rectifier may include one or more thyristor, field effect transistor, insulated gate bipolar transistor, or another active component.

Figure 15:
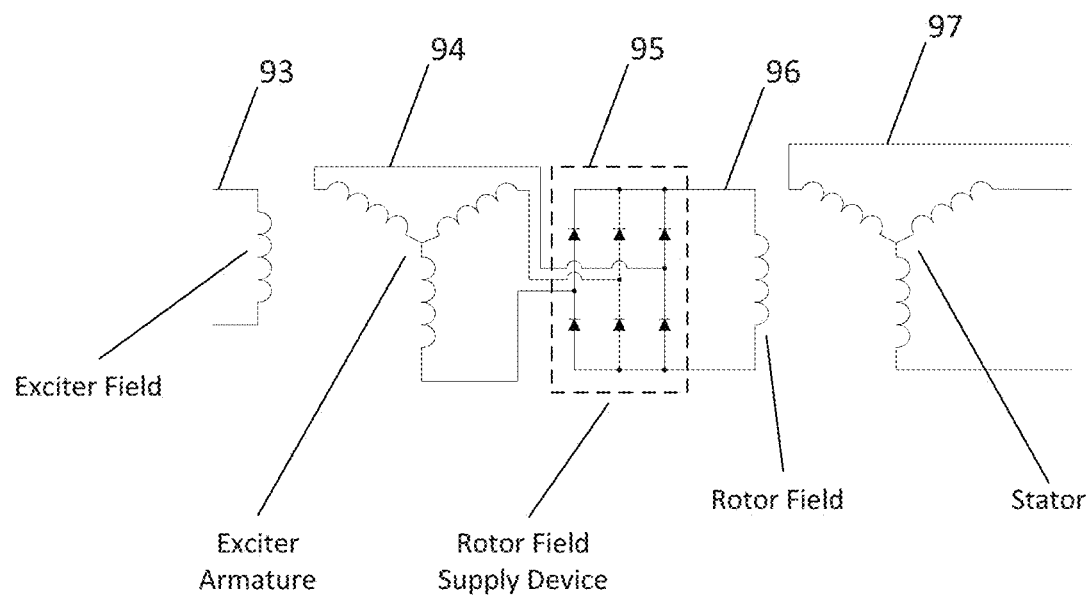
FIG. 15 illustrates an example electrical diagram for the dual axis generator.

FIG. 15 illustrates an example electrical diagram for the dual axis generator. The electrical diagram includes the electrical components that for the dual axis generator for the interaction between the main stator device 24b, the exciter field device 24c, the rotor field device 24a and the exciter armature device 24d. The electrical diagram includes an exciter field component 93 for the exciter field device 24c, an exciter armature component 94 for the exciter armature device 24d, a diode network 95 for the field current supply device 71, a rotor coil 96 for the rotor field device 24a, and a stator component 97 for the main stator device 24b. The exciter field 93, rotor field 96, exciter armature 94, and stator 97 may be a single-phase coil or poly-phase coils. The rotor field supply device 95 may be an inverter to drive the rotor field 96.

Figure 16:
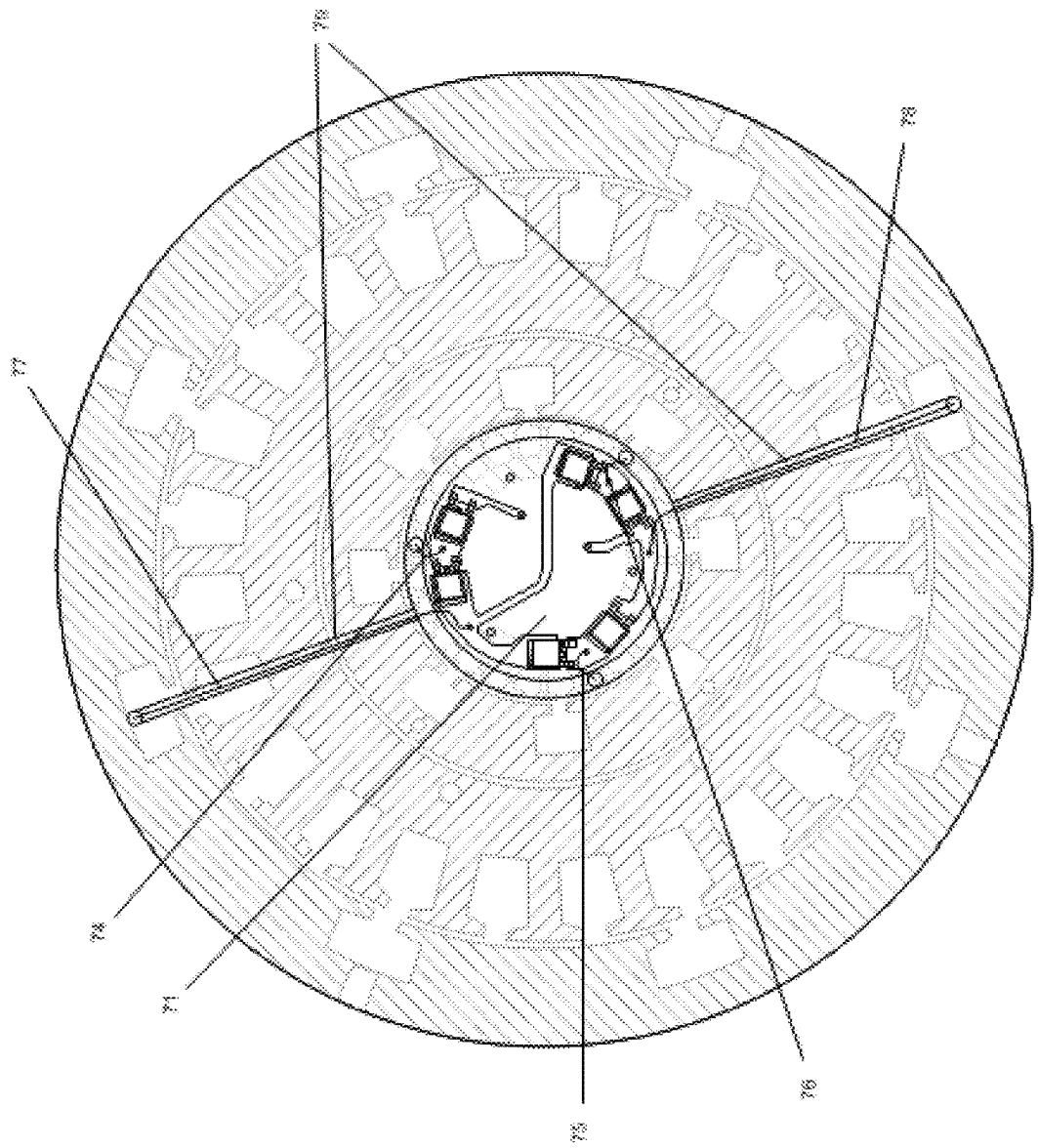
FIG. 16 illustrates a dual axis generator with the access cover removed.
Figure 16:
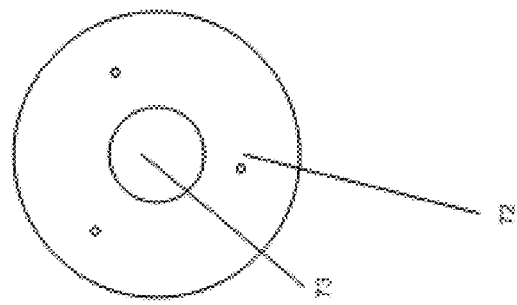

FIG. 16 illustrates a dual axis generator with the access cover 72 removed. The field current supply device 71 is protected by an access cover 72, which may be sealed with a gasket, o-ring, or other sealant to prevent exposure of the field current supply device 71 to moisture. The placement of access cover 72 allows for easy access to the field current supply device. In addition, the access cover 72 may contain a transparent window 73 that allows for optical communication between a stationary communication assembly and the field current supply device 71. The transparent window 73 may be formed of plastic or glass. The transparent window 73 may be replaced by an opaque or other type of protective color. The transparent window 73 may be selectively transparent to certain wavelengths of light but not transparent to other wavelengths.

The field current supply device 71 receives power from the exciter armature through exciter armature leads 74, 75, 76 and provides power to the rotor field using field leads 77, 78 in slots 79. The slots 79 may be covered or remain open. Alternatively, the field current supply device 71 may receive power through bolts connecting it to the exciter armature leads 74, 75, 76 and supply power through bolts to field leads 77 and 78. The bolts may also hold the field current supply device 71 to a rotating member.

The output voltage of a given generator depends primarily on two factors, the speed that the alternator is rotating and the magnetic flux generated by the rotating field. In a permanent magnet generator, the magnetic flux is determined by the properties of the permanent magnets, so the generator outputs a voltage that is primarily determined by the speed of the engine. Because the field current can be controlled on a dual-axis generator, the output voltage of the alternator is dependent on both factors and the output voltage can be controlled independently of the engine speed.

Because the output voltage can be controlled independently of engine speed, the dual-axis generator allows for different engine speed versus load profiles while producing a given output voltage. A permanent magnet generator typically increases speed when load is applied to offset internal voltage drop due to inductance and resistance on the stator windings and armature reaction flux, but the dual-axis generator permits operation in a variety of speed versus load scenarios.

Figure 17:
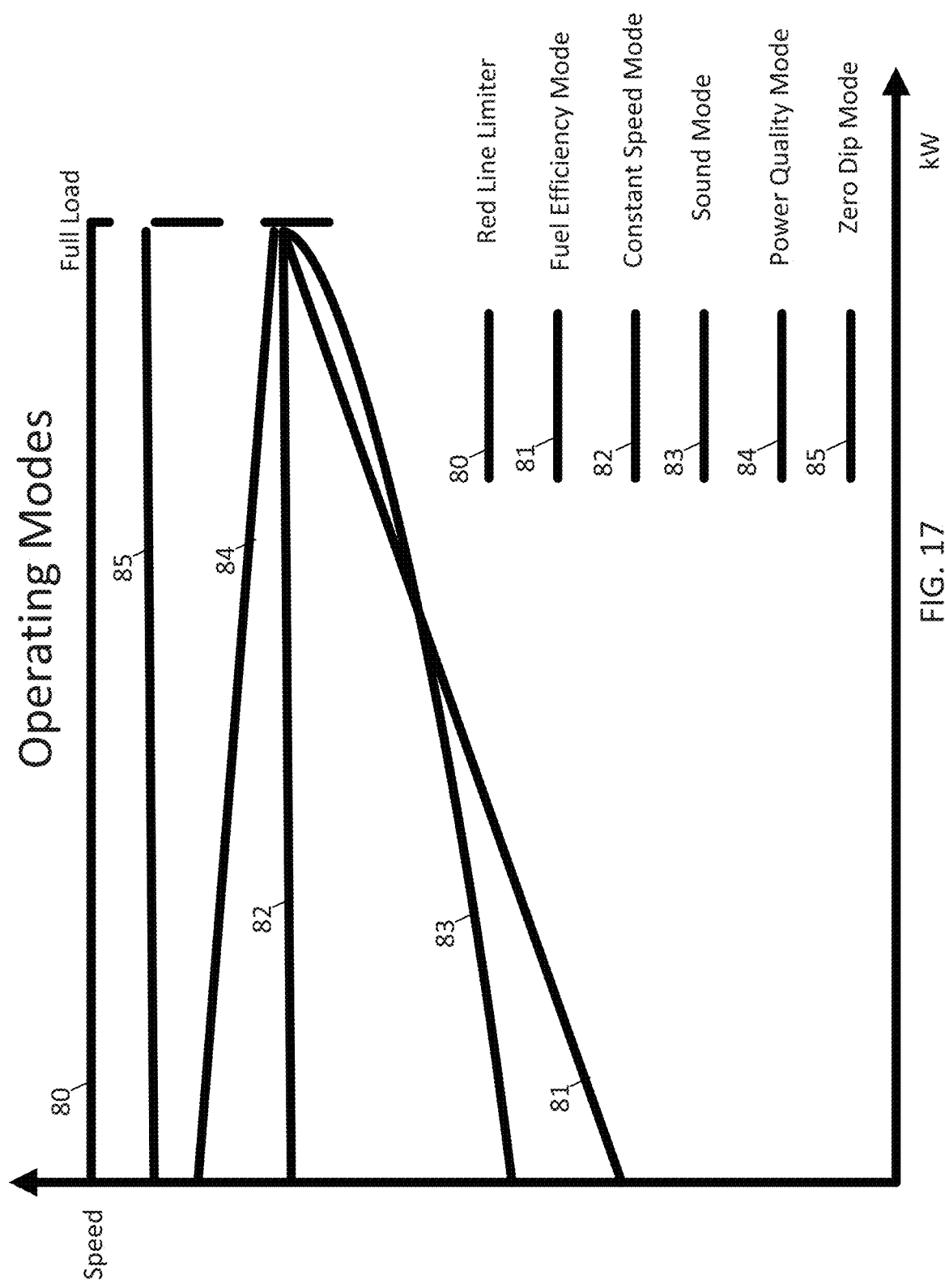
FIG. 17 illustrates example operating modes for the generator controller.

FIG. 17 illustrates example operating modes for the generator controller and the dual axis generator. The operating modes are illustrated by plots including a plot for each of a fuel efficiency mode 81, a constant speed mode 82, a sound mode 83, a power quality mode 84, and a zero dip mode 85. Additional modes not illustrated are possible. For example, a vibration minimization mode may avoid speeds that induce resonant vibration in the engine or nearby objects. The design of the dual axis generator permits these operating modes because the output voltage of the generator is not completely determined by the speed of the engine. The area below each of the mode plots represents the operating range of the dual axis generator in that mode. The red line limiter 80 illustrates that maximum operation of the dual axis alternator. Various embodiments may include any combination of the fuel efficiency mode 81, the constant speed mode 82, the sound mode 83, the power quality mode 84, and the zero dip mode 85. One or modes may include an increased speed as load increases (e.g., the fuel efficiency mode 81 and the sound mode 83), one or more other modes may include a decreased speed as load increases (e.g., power quality mode), one or more modes may include a combination of increasing and decreasing speed with increasing load, and one or more other modes may include a substantially constant speed as load increases (e.g., zero dip mode 85). A substantially constant speed may be a speed within a set percentage (e.g., 1%, 5%, or 10%).

For a permanent magnet generator, flux is determined by the properties of the permanent magnets and is not controlled. For a given speed, flux passes coils at a set rate, which creates a specific output voltage. If the output voltage is to be determined with fluctuations in the load, an armature reaction must be offset. When there is a load connected to the armature windings, there is current flowing through the armature windings. This creates an additional mutual flux linkage component that is in opposition to the flux component from the field winding; this flux linkage is denoted as armature reaction. Thus, as the load on the alternator is increased, the speed of the engine is increased to maintain the output voltage in a permanent magnet design.

However, in the wound field designs described herein, there is more flexibility to counter the armature reaction. Similar to the permanent magnet design, the speed of the engine may be increased. However, a second option is to increase the field current to the main rotor field device 24a using an exciter mechanism to cause voltage to increase. Thus, through the generator controller 71, the field current is controller to control the output of the generator. The field control may offset signal drooping from load fluctuations. Because the speed profile is flexible, various modes may be realized.

The power quality mode 84 may include a first droop setting. In first droop setting, when there is a load transient, the dual axis generator reacts quickly because the speed of the engine is higher in a no load condition and has room to dip as the load is applied.

A load transient is a change in load over time. The load may go up and down, but generally generator output responses are described in terms of increasing loads.

The fuel efficiency mode 81 may include a second droop setting. In the second droop setting, when there is a load transient, there is less response by the dual axis generator because fuel efficiency is optimized. That is, for the highest fuel efficiency, the engine should be run at the lowest speed that provides adequate output for the load. The fuel efficiency mode 81 may have a slow response time or lag time, which may cause lights to dim or other problems when load transients occur.

The constant speed mode 82 may include a third droop setting that is at or near zero, which effectively targets a constant speed. As load is applied, the throttle of the engine is opened to maintain the speed of the engine sufficient to provide the rated output of the generator. The output speed may not correspond to a typical output speed for a synchronous alternator (e.g., 1800 RPM). In addition, the output speed target is determined a required power output of the generator and not by the required frequency of the output of the generator.

In a zero dip mode or a motor starting mode 85, when there is a load transient, there is no, or very little, response to the output voltage of the dual axis generator. The zero dip mode 85 may include a profile that is inverted. For example, the engine may run at a speed (e.g., 2200 rpm) that is faster than normal speed (e.g., 1800 rpm) so that any load transients are absorbed without causing a disruption in the output voltage.

Figure 18:
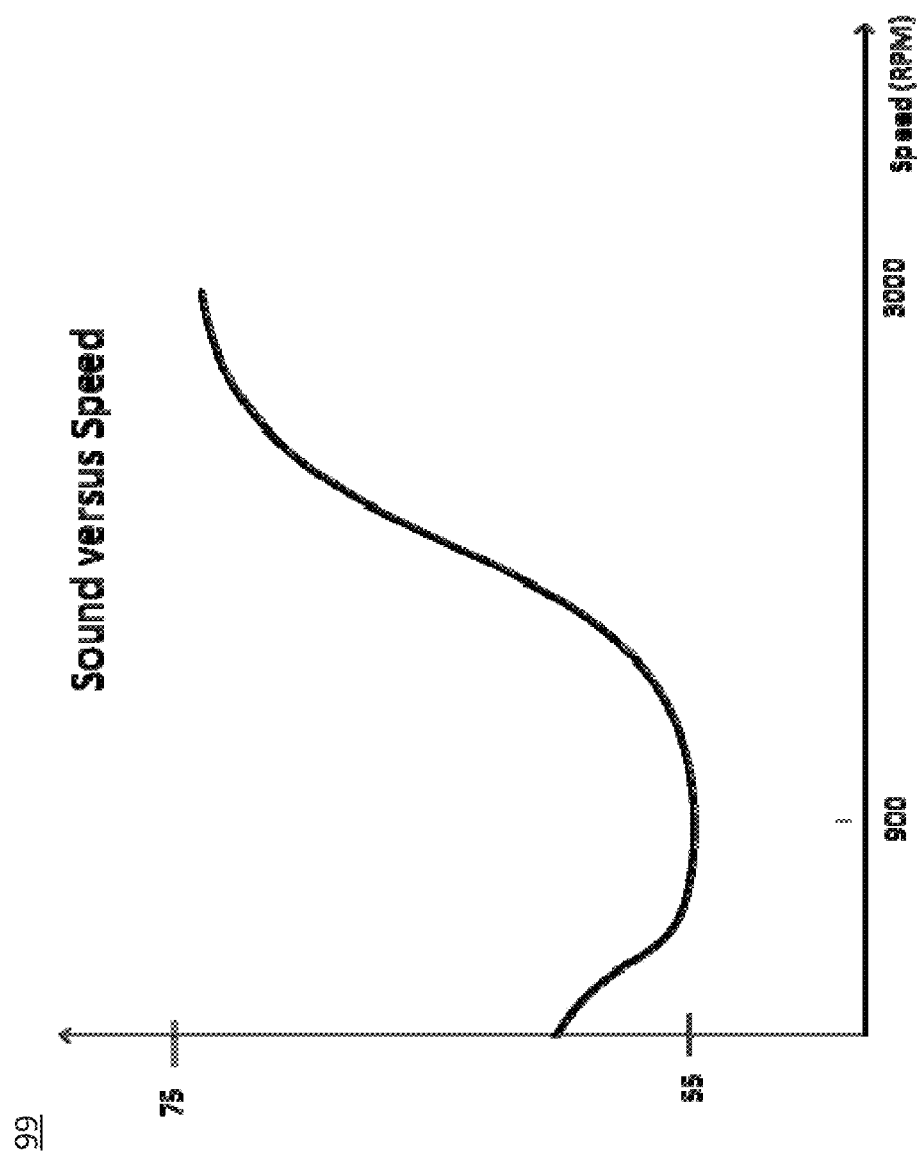
FIG. 18 illustrates an example speed profile plot.

FIG. 18 illustrates an example sound versus speed curve 99 for the sound mode 83. Typically, an engine is quieter as speed is lowered. However, at certain low speeds, engines may experience resonant frequencies of components or other anomalies that cause the engine to shake and produce more sound at lower speeds. Some low resonant frequencies may be below the range of vibration dampeners (e.g., vibromounts). Therefore, the speed curve for the sound mode 83 may overlap the fuel efficiency mode 81 at higher speeds or powers but run at higher speeds than the fuel efficiency mode 81 at lower speeds. The generator controller 91 is configured to access the speed profile and control the speed of the engine to depend on both the load on the generator and the speed profile in order to minimize the sound. Human ears receive different sounds at different sensitivity levels. A perceived sound level may vary disproportionately to sound level. The sound versus speed profile 99 may be modified to account for this phenomenon.

Figure 19:
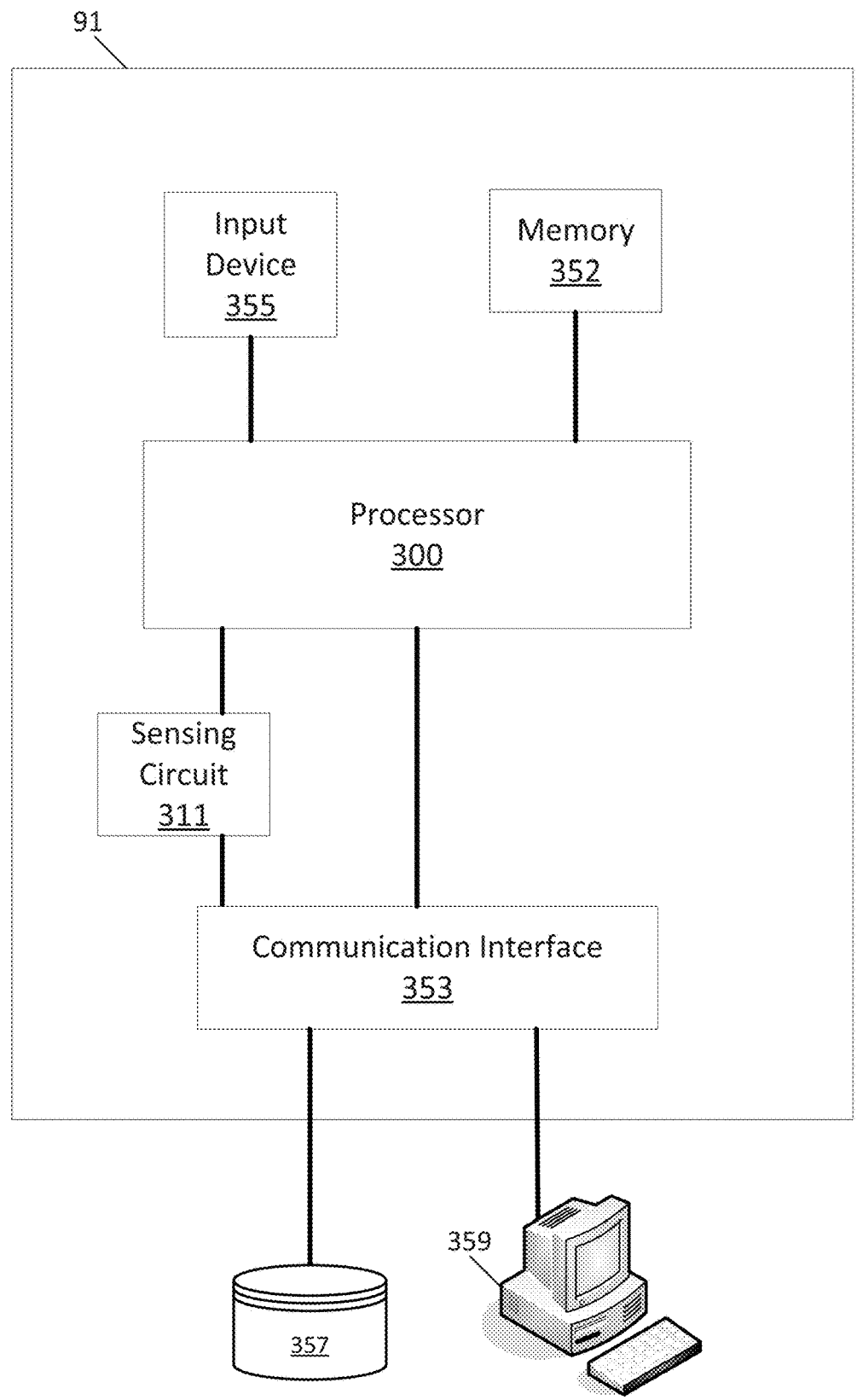
FIG. 19 illustrates an example controller.

FIG. 19 illustrates an example generator controller 91. The following description may also be applied to other implementations of the field current supply device 71 besides the generator controller 91. The generator controller 91 may include a processor 300, a memory 352, and a communication interface 353. The generator controller 91 may be connected to a workstation 359 or another external device (e.g., control panel) and/or a database 357 for receiving user inputs, system characteristics, and any of the values described herein. Optionally, the generator controller 91 may include an input device 355 and/or a sensing circuit 311. The sensing circuit 311 receives sensor measurements from as described above. Additional, different, or fewer components may be included. The processor 300 is configured to perform instructions stored in memory 352 for executing the algorithms described herein. The processor 300 may identify an engine type, make, or model, and may look up system characteristics, settings, or profiles based on the identified engine type, make, or model.

Figure 20:
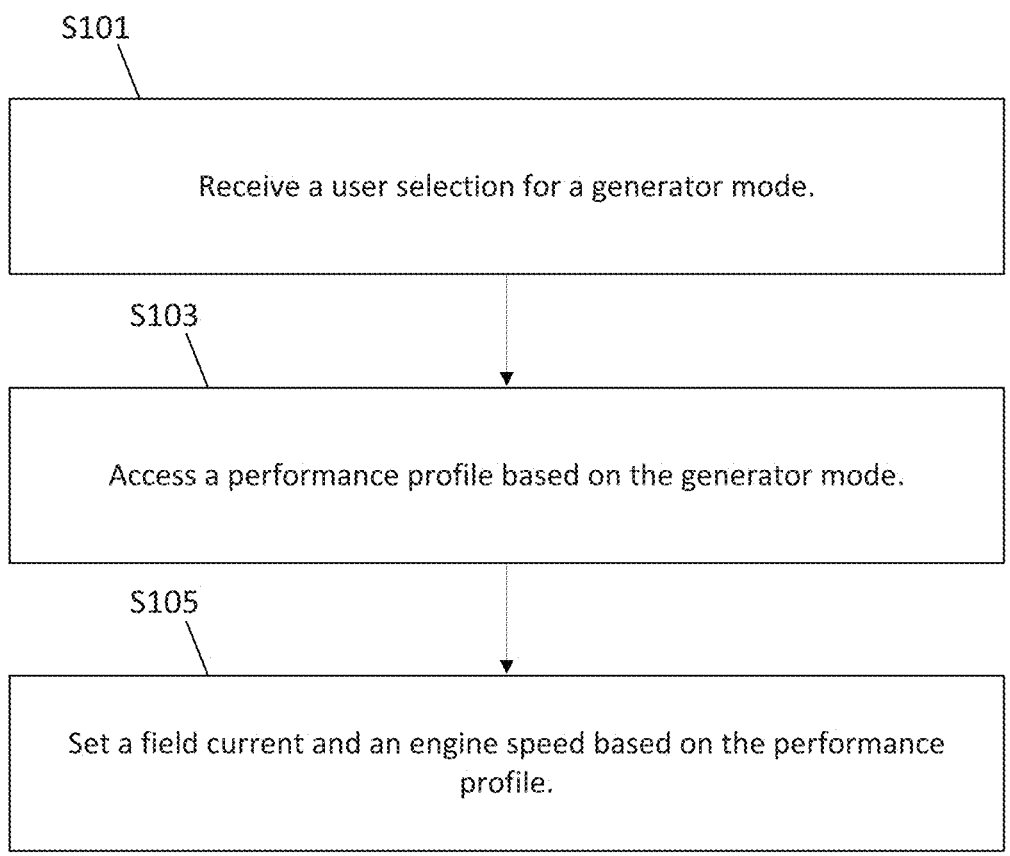
FIG. 20 illustrates a flow chart for the controller.

FIG. 20 illustrates a flow chart for generator mode and performance profile selection for the dual axis generator. Additional, different of fewer acts may be included.

At act S101, the processor 300 receives a user selection for generator mode from the input device 355. The mode may be any of the fuel efficiency mode 81, the constant speed mode 82, the sound mode 83, the power quality mode 84, and the zero dip mode 85. The user selection may be made on a keypad, touch screen, push button, or another input.

At act S103, the processor 300 accesses a performance profile from the memory 352 based on the selected generator mode from the user selection. The performance profile may be stored in memory 352. A different profile may be stored for each of the fuel efficiency mode 81, the constant speed mode 82, the sound mode 83, the power quality mode 84, and the zero dip mode 85.

At act S105, the processor 300 may set a field current or an engine speed based on the performance profile. The processor 300 accesses the appropriate profile which may be a lookup table that associates target engine speeds with load values. The sensing circuit 311 may calculate a load value based on output power, voltage, or current. In one example, the load value may be inferred from a change that occurs in the field current.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 352 may be a volatile memory or a non-volatile memory. The memory 352 may include one or more of a read only memory (ROM), random access memory (RAM), a flash memory, an electronic erasable program read only memory (EEPROM), or other type of memory. The memory 352 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 353 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352 or database 357) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

We claim:

1. An apparatus comprising:
   an exciter field device generating an exciter magnetic field in a first air gap;
   an exciter armature device in a common plane normal to the axis of rotation configured to rotate with respect to the exciter magnetic field and impart a first voltage in a first set of coils at the first air gap;
   a main stator device including a second set of coils; and
   a rotor field device in the common plane normal to the axis of rotation configured to be energized by the first current in the first set of coils and generate a main magnetic field that imparts a second voltage on the main stator device at a second air gap, wherein the first air gap and the second air gap are spaced apart axially in an axial plane.

2. The apparatus of claim 1, wherein the exciter armature device, the exciter field device, the main stator device, and the rotor field device are integrated in a flywheel of an engine.

3. The apparatus of claim 1, further comprising:
a coolant system configured to cool the main stator device, the exciter field device, or both.

4. The apparatus of claim 3, wherein the coolant system includes a common coolant passage with an engine.

5. The apparatus of claim 3, wherein the coolant system is coupled to an external coolant source.

6. The apparatus of claim 3, wherein the coolant system includes a heat exchanger.

7. The apparatus of claim 3, wherein the coolant system includes a coolant passage through at least one of the main stator device and the exciter armature device.

8. The apparatus of claim 1, further comprising:
a rectifying device configured to convert the first current in the first set of coils into a rectified signal supplied to the rotor field device.

9. The apparatus of claim 8, wherein the rectifying device is an analog circuit.

10. The apparatus of claim 8, wherein the rectifying device is a controlled rectifier.

11. The apparatus of claim 10, wherein the controlled rectifier controls an output voltage of the stator device.

12. The apparatus of claim 1, wherein the exciter armature device and the rotor field device are rigidly mounted to each other or integrally formed.

13. The apparatus of claim 1, wherein the exciter field device and main stator device are rigidly mounted to each other or integrally formed.

14. The apparatus of claim 1, further comprising:
a generator controller configured to operate in a plurality of power modes.

15. The apparatus of claim 14, wherein at least one of the plurality of power modes includes a power quality mode having a first droop setting, a fuel efficiency model having a second droop setting, or a constant mode having a third droop setting.

16. The apparatus of claim 15, where the plurality of power modes includes a sound mode having a sound to speed profile.

17. A method including:
rotating an exciter field device configured to generate an exciter magnetic field in a first air gap with an exciter armature device in a common plane normal to an axis of rotation;
imparting a first voltage at a first set of coils via the exciter magnetic field and the first air gap;
rotating a main stator device including a second set of coils; and
generating a main magnetic field that imparts a second voltage on the main stator device via a second air gap with a rotor field device in the common plane normal to the axis of rotation, wherein the first air gap and the second air gap are spaced apart axially in an axial plane.

18. The method of claim 17, wherein the exciter armature device and the rotor field device are rigidly mounted to each other or integrally formed.

19. The method of claim 17, wherein the exciter field device and main stator device are rigidly mounted to each other or integrally formed.

20. A generator comprising:
a stator frame including:
an exciter field device generating an exciter magnetic field in a first air gap; and
a main stator device including a main set of coils;
a rotor frame including:
an exciter armature device in a common plane normal to an axis of rotation configured to rotate with respect to the exciter magnetic field and impart a first voltage in an exciter set of coils at the first air gap; and
a rotor field device in the common plane normal to the axis of rotation configured to be energized by the first current in the exciter set of coils and generate a main magnetic field that imparts a second voltage on the main stator device at a second air gap, wherein the first air gap and the second air gap are spaced apart axially in an axial plane between the exciter armature device and the rotor field device on one side of the axial plane and the exciter field device and main stator device on the other side of the axial plane.

* * * * *